(12) United States Patent
Bar Oz et al.

(10) Patent No.: US 10,963,314 B2
(45) Date of Patent: Mar. 30, 2021

(54) DISCOVERY AND MAPPING OF A PLATFORM-AS-A-SERVICE ENVIRONMENT

(71) Applicant: ServiceNow, Inc., Santa Clara, CA (US)

(72) Inventors: Tom Bar Oz, Herzliya (IL); Hail Tal, Kohav Yair (IL); Shay Herzog, Raanana (IL); Shiri Hameiri, Kfar Saba (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/528,309

(22) Filed: Jul. 31, 2019

(65) Prior Publication Data
US 2021/0034431 A1 Feb. 4, 2021

(51) Int. Cl.
*H04L 12/00* (2006.01)
*G06F 9/50* (2006.01)
*H04L 29/08* (2006.01)

(52) U.S. Cl.
CPC ........... *G06F 9/5077* (2013.01); *H04L 67/02* (2013.01); *H04L 67/1097* (2013.01)

(58) Field of Classification Search
CPC .. G06F 9/5077; G06F 6/5061; G06F 9/45533; G06F 9/5011; G06F 9/505; G06F 9/5016; G06F 12/0284; G06F 21/6218; H04L 47/70
USPC ........................................ 709/217, 218, 219
See application file for complete search history.

(56) References Cited

U.S. PATENT DOCUMENTS

| | | | |
|---|---|---|---|
| 5,978,594 A | 11/1999 | Bonnell | |
| 6,301,616 B1 * | 10/2001 | Pal | G06F 9/5011 709/203 |
| 6,321,229 B1 | 11/2001 | Goldman | |
| 6,799,189 B2 | 9/2004 | Huxoll | |
| 6,816,898 B1 | 11/2004 | Scarpelli | |
| 6,895,586 B1 | 5/2005 | Brasher | |
| 6,957,435 B2 * | 10/2005 | Armstrong | G06F 9/5077 711/173 |
| 7,020,706 B2 | 3/2006 | Cates | |
| 7,027,411 B1 | 4/2006 | Pulsipher | |

(Continued)

*Primary Examiner* — Frantz Coby
(74) *Attorney, Agent, or Firm* — Fletcher Yoder PC

(57) ABSTRACT

A system includes persistent storage configured to store data on behalf of a managed network and a discovery application configured to perform operations. An application system hosts software applications on behalf of the managed network. The operations include obtaining a service identifier for the application system and, based thereon, determining partitions into which the application system is divided. The operations also include determining, within each respective partition, spaces between which the software applications of the managed network are distributed, and determining, within each respective space, one or more software applications of the software applications of the managed network. The respective space provides an isolated computing environment for execution of the one or more software applications therein. The operations further include determining a mapping that indicates a distribution of (i) the spaces among the partitions and (ii) the software applications among the spaces, and storing, in the persistent storage, the mapping.

17 Claims, 10 Drawing Sheets

(56) References Cited

U.S. PATENT DOCUMENTS

| | | | | |
|---|---|---|---|---|
| 7,088,995 | B2 * | 8/2006 | Rao | H04L 29/06 455/410 |
| 7,140,020 | B2 * | 11/2006 | McCarthy | G06F 9/5061 718/104 |
| 7,290,260 | B2 * | 10/2007 | Miller | G06F 9/5072 709/226 |
| 7,389,398 | B2 * | 6/2008 | Garney | G06F 9/5077 711/173 |
| 7,392,300 | B2 | 6/2008 | Knantharangachar | |
| 7,617,073 | B2 | 11/2009 | Trinon | |
| 7,685,167 | B2 | 3/2010 | Mueller | |
| 7,716,353 | B2 | 5/2010 | Golovinsky | |
| 7,769,718 | B2 | 8/2010 | Murley | |
| 7,844,947 | B2 * | 11/2010 | Irving | G06F 9/44505 717/120 |
| 7,877,783 | B1 | 1/2011 | Cline | |
| 7,941,506 | B2 | 1/2011 | Cline | |
| 7,925,981 | B2 | 4/2011 | Pourheidari | |
| 7,933,927 | B2 | 4/2011 | Dee | |
| 7,945,860 | B2 | 5/2011 | Vambenepe | |
| 8,020,164 | B2 * | 9/2011 | Barsness | G06F 9/45533 709/226 |
| 8,082,222 | B2 | 12/2011 | Rangarajan | |
| 8,108,869 | B2 * | 1/2012 | Jackson | G06F 21/6218 718/104 |
| 8,151,261 | B2 | 4/2012 | Sirota | |
| 8,302,102 | B2 * | 10/2012 | Anand | G06F 9/5077 718/104 |
| 8,346,752 | B2 | 1/2013 | Sirota | |
| 8,380,645 | B2 | 2/2013 | Kowalski | |
| 8,402,127 | B2 | 3/2013 | Solin | |
| 8,554,740 | B2 | 10/2013 | Rangaranjan | |
| 8,554,750 | B2 | 10/2013 | Rangaranajan | |
| 8,612,408 | B2 | 12/2013 | Trinon | |
| 8,646,093 | B2 | 2/2014 | Myers | |
| 8,683,032 | B2 | 3/2014 | Spinelli | |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Mueller | |
| 8,907,988 | B2 | 12/2014 | Poston | |
| 8,910,278 | B2 * | 12/2014 | Davne | H04L 67/02 726/22 |
| 9,015,188 | B2 | 4/2015 | Behne | |
| 9,037,536 | B2 | 5/2015 | Vos | |
| 9,063,746 | B2 * | 6/2015 | Yousouf | G06F 8/60 |
| 9,065,783 | B2 | 6/2015 | Ding | |
| 9,098,322 | B2 | 8/2015 | Apte | |
| 9,110,779 | B2 * | 8/2015 | Ashok | G06F 9/5077 |
| 9,122,552 | B2 | 9/2015 | Whitney | |
| 9,137,115 | B2 | 9/2015 | Mayfield | |
| 9,158,565 | B2 * | 10/2015 | Jakoljevic | G06F 9/45533 |
| 9,261,372 | B2 | 2/2016 | Cline | |
| 9,317,327 | B2 | 4/2016 | Apte | |
| 9,323,801 | B2 | 4/2016 | Morozov | |
| 9,357,034 | B2 * | 5/2016 | Kumar | G06F 9/5072 |
| 9,363,252 | B2 | 6/2016 | Mueller | |
| 9,412,084 | B2 | 9/2016 | Kowalski | |
| 9,467,344 | B2 | 10/2016 | Gere | |
| 9,491,112 | B1 * | 11/2016 | Patel | H04L 47/70 |
| 9,534,903 | B2 | 1/2017 | Cline | |
| 9,535,737 | B2 | 1/2017 | Joy | |
| 9,613,070 | B2 | 4/2017 | Kumar | |
| 9,631,934 | B2 | 4/2017 | Cline | |
| 9,645,833 | B2 | 5/2017 | Mueller | |
| 9,654,473 | B2 | 5/2017 | Miller | |
| 9,659,051 | B2 | 5/2017 | Hutchins | |
| 9,766,935 | B2 | 9/2017 | Kelkar | |
| 9,792,387 | B2 | 10/2017 | George | |
| 9,805,322 | B2 | 10/2017 | Kelkar | |
| 9,852,165 | B2 | 12/2017 | Morozov | |
| 9,967,162 | B2 | 5/2018 | Spinelli | |
| 10,002,203 | B2 | 6/2018 | George | |
| 2007/0067366 | A1 * | 3/2007 | Landis | G06F 12/1009 |
| 2008/0155222 | A1 * | 6/2008 | Hasegawa | G06F 12/0284 711/173 |
| 2008/0263561 | A1 * | 10/2008 | Tagashira | G06F 9/5016 718/104 |
| 2011/0126188 | A1 * | 5/2011 | Bernstein | G06F 11/3688 717/174 |
| 2013/0191840 | A1 * | 7/2013 | Barsness | G06F 9/505 718/104 |
| 2015/0324182 | A1 * | 11/2015 | Barros | G06F 9/44505 717/174 |
| 2016/0034277 | A1 * | 2/2016 | Syed | G06F 8/76 717/136 |

* cited by examiner

DISCOVERY AND MAPPING OF A PLATFORM-AS-A-SERVICE ENVIRONMENT

BACKGROUND

Computing devices, software applications, storage structures, and other computing resources that make up a computer network may be discovered and the relationships therebetween may be mapped. These elements of the computer network, as well as the relationships, may be stored as configuration items in a database. The stored configuration items may later be retrieved and used to generate a visualization of a state or arrangement of these elements within the computer network. Discovering computing resources involves developing software processes that are capable of gathering the information needed for detection, classification, and/or identification of these computing resources.

SUMMARY

An application system may host software applications on behalf of a managed network. The application system may provide a computing environment that facilitates the development, execution, and scaling of software applications. Notably, the application system may allow the enterprise associated with the managed network to avoid the complexity of building and maintaining the computing infrastructure and environments involved in the development, execution, and scaling of the software applications. Thus, the enterprise may focus on developing the software applications, rather than the infrastructure and environments therefor.

The application system may be hosted on an infrastructure system (e.g., an Infrastructure-as-a-Service system) that provides computing resources on behalf of the managed network. These computing resources may include networks, virtual and/or physical computing devices, storage systems, operating systems, and middleware (e.g., various runtime environments), among other possibilities. In some cases, both the application system and the infrastructure system may be delivered by the same provider. Alternatively, the application system and the infrastructure system may be delivered by different providers, thus allowing the managed network to select the infrastructure systems across which the application system is hosted. Accordingly, the application system may be configured to be executed by a plurality of different infrastructure systems (e.g., MICROSOFT® AZURE®, AMAZON WEB SERVICES®, GOOGLE CLOUD PLATFORM®, etc.). That is, the application system may be compatible with the plurality of different infrastructure systems, but may nevertheless provide a similar or uniform computing environment across these different infrastructure systems. The application system may be, for example, CLOUD FOUNDRY®, IBM® BLUEMIX®, or PEGA CLOUD®, among other possibilities.

The application system may be organized into partitions and spaces to allow for control over usage of the computing resources provided by the infrastructure system. Namely, the managed network may divide the computing resources among partitions (sometimes referred to as organizations), each of which may be associated with a corresponding computing resource quota that defines, for example, the maximum number of processors, memory, executing applications, bus bandwidth, and/or network bandwidth, among other resources, dedicated to the corresponding partition. An enterprise may use partitions to, for example, separate the computing resources and applications dedicated to different parts and/or different departments within the enterprise.

Each partition may include therein one or more spaces that share the computing resources, and thus the quota, of the partition. Each space may, in turn, be configured to execute one or more software applications. Each space may provide a computing environment for execution of its corresponding software applications. The computing environment of a given space may be isolated from the computing environments of other spaces, thus allowing different spaces to provide different types of computing environments. For example, a first space may be used to provide a staging environment for testing of software applications, while a second space may be used to provide a production environment for live deployment of tested versions of these software applications. In another example, spaces may be used to separately maintain the software applications of different departments within a given part of an enterprise.

While the application system may facilitate the deployment and execution of software applications, the application system may also add some complexity that may make use and control thereof difficult. For example, a large enterprise may include tens or hundreds of partitions, and tens, hundreds, or thousands of different spaces distributed across these partitions. Thus, it may be difficult to monitor, for example, whether the spaces within a given partition utilize the resource quota thereof efficiently. It may also be difficult to keep track of the manner in which the partitions, spaces, and software applications are organized, or to determine where exactly different software applications are hosted (e.g., which virtual computing device of the infrastructure systems hosts a particular software application). This problem may be compounded as spaces and applications change over time, either due to manual modifications by programmers or automatic scaling by the application system.

Thus, a discovery application may be configured to discover and map the different elements of the application system, thereby allowing the state of the application system to be monitored and adjusted. Specifically, the discovery application may obtain a service identifier for the application system. This service identifier may be used by the discovery application to authenticate itself to the application system, thus allowing the discovery application to explore and map the hierarchy thereof. Namely, the discovery application may determine the partitions associated with the service identifier, the spaces in each of the partitions, and the software applications in each of the spaces. The discovery application may then generate and store a mapping that shows how the applications are distributed among the spaces and how the spaces are distributed among the partitions.

The discovery application may additionally determine various attributes of the partitions, spaces, and applications. For example, the discovery application may determine the computing resource quota for each partition and the amount of computing resources actually used by the spaces within a given partition. As another example, the discovery application may determine the operating system provided by a particular space.

The discovery application may also determine and map aspects of a network that interconnects the software applications to each other and to other computing resources outside of the application system. Namely, the application system may direct network traffic to a particular software application based on routes. A route may take the form of a uniform resource locator (URL) associated by the application system with a particular software application. Thus, for example, an incoming hypertext transfer protocol (HTTP) request may be routed to a particular software application when the URL to which this request is addressed matches the URL of a route associated with the particular software application. Notably, each route may be based on a domain that resolves to a corresponding load balancer that is configured to match the URLs of incoming requests with routes, and thus direct network traffic accordingly. The discovery application may determine and map the routes and the domains, indicating the domains to be a subset of the partitions and the routes to be a subset of the spaces.

The discovery application may also be configured to determine and map the distribution of the partitions, spaces, and/or software applications among the computing resources provided by the infrastructure system. In cases where the application system and the infrastructure system are integrated (e.g., provided by the same provider), such mapping may be carried out by a single discovery pattern or process. In cases where these systems are independent (e.g., provided by different providers), the discovery application may be configured to discover and map the computing resources of the infrastructure system using a first discovery pattern or process, and to discover and map the application system using a second discovery pattern or process. The maps or aspects thereof generated by the two patterns may subsequently be merged or otherwise related to one another to indicate how elements of the application system utilize the computing resources of the infrastructure system.

In some implementations, the discovery and mapping process may be facilitated by an application programming interface (API) provided by the application system. Namely, the discovery application may obtain identifiers and attributes of the partitions, spaces, applications, and other elements by way of respective functions of the API. The discovery application may subsequently map the relationships between these elements based on their respective attributes. In other implementations, the identifiers and attributes may be obtainable by way of a remotely-accessible command line interface provided by the application system. The discovery application may similarly use the command line interface to execute functions that generate the identifiers and attributes of the partitions, spaces, applications, and other elements of the application system. The discovery application may also be configured to use other types of interfaces to collect the information involved in discovery and mapping of the application system.

The mapping may be updated to represent any modifications or changes made to the application system over time. In some cases, the discovery application may be configured to update the mapping by periodically obtaining updated information from the application system that indicates any modifications made to the partitions, spaces, applications, or other components. In other cases, the application system may provide a notification service that generates and transmits, to the discovery application, notifications indicative of modifications made to the application system. Based on such a notification, the discovery application may obtain, from the application system, data indicative of the modifications indicated by the notification. Notably, by using the notification service, the discovery application may focus the process of updating the mapping on the components of the application system that have actually been modified, rather than remapping the entirety of the application system.

Accordingly, a first example embodiment may involve a computing system that includes persistent storage configured to store data on behalf of a managed network, where an application system hosts software applications on behalf of the managed network, and a discovery application configured to perform operations. The operations may include obtaining a service identifier for the application system and determining, based on the service identifier, one or more partitions into which the application system is divided. Each partition of the one or more partitions is allocated a computing resource quota. The operations may also include determining, within each respective partition of the one or more partitions, one or more spaces between which the software applications of the managed network are distributed. The one or more spaces of the respective partition share the computing resource quota thereof. The operations may additionally include determining, within each respective space of the one or more spaces, one or more software applications of the software applications of the managed network. The respective space provides an isolated computing environment for execution of the one or more software applications therein. The operations may further include determining a mapping that indicates a distribution of (i) the one or more spaces among the one or more partitions and (ii) the software applications among the one or more spaces. The operations may yet further include storing, in the persistent storage, the mapping.

A second example embodiment may involve obtaining, by a discovery application, a service identifier for an application system that hosts software applications on behalf of a managed network. The second example embodiment may also involve determining, by the discovery application and based on the service identifier, one or more partitions into which the application system is divided. Each partition of the one or more partitions is allocated a computing resource quota. The second example embodiment may additionally involve determining, by the discovery application and within each respective partition of the one or more partitions, one or more spaces between which the software applications of the managed network are distributed. The one or more spaces of the respective partition share the computing resource quota thereof. The second example embodiment may yet additionally involve determining, by the discovery application and within each respective space of the one or more spaces, one or more software applications of the software applications of the managed network. The respective space provides an isolated computing environment for execution of the one or more software applications therein. The second example embodiment may further involve determining, by the discovery application, a mapping that indicates a distribution of (i) the one or more spaces among the one or more partitions and (ii) the software applications among the one or more spaces. The second example embodiment may yet further involve storing, in persistent storage configured to store data on behalf of the managed network, the mapping.

In a third example embodiment, an article of manufacture may include a non-transitory computer-readable medium, having stored thereon program instructions that, upon execution by a computing system, cause the computing system to perform operations in accordance with the first example embodiment and/or the second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment and/or the second example embodiment.

In a fifth example embodiment, a system may include various means for carrying out each of the operations of the first example embodiment and/or the second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
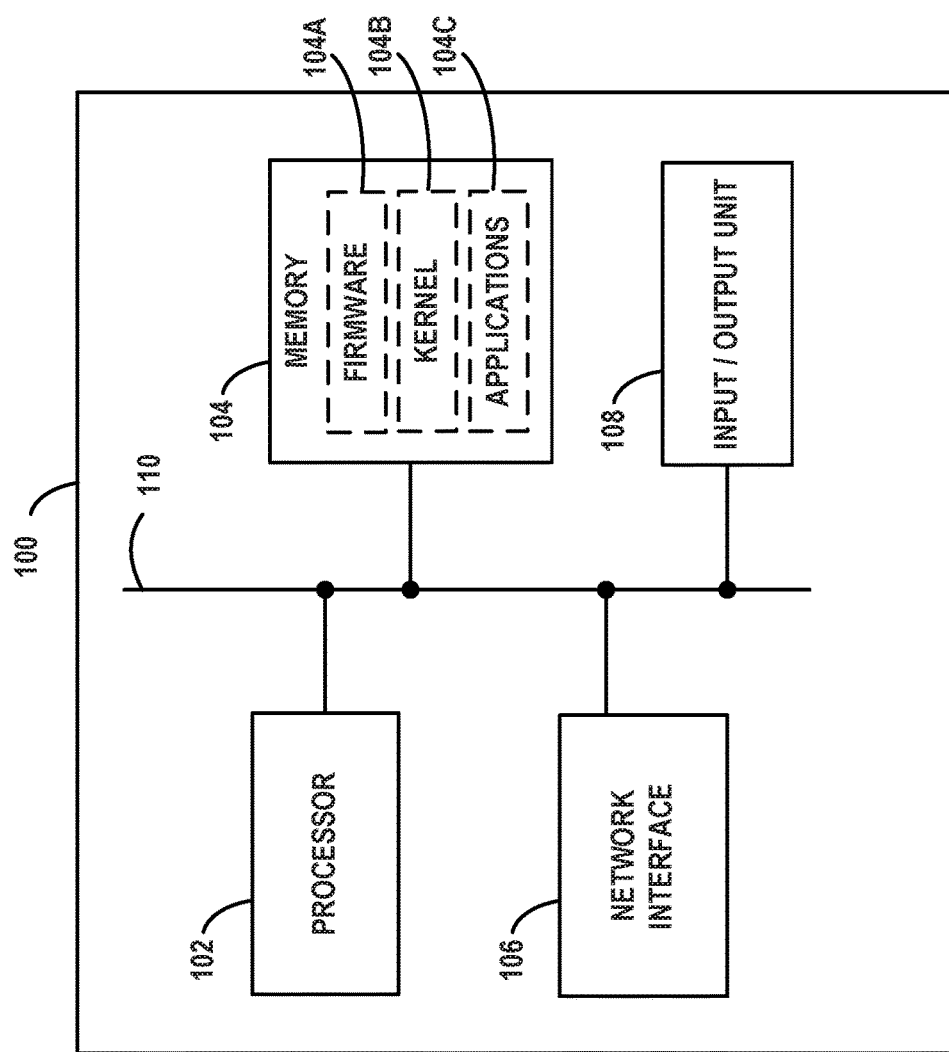
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
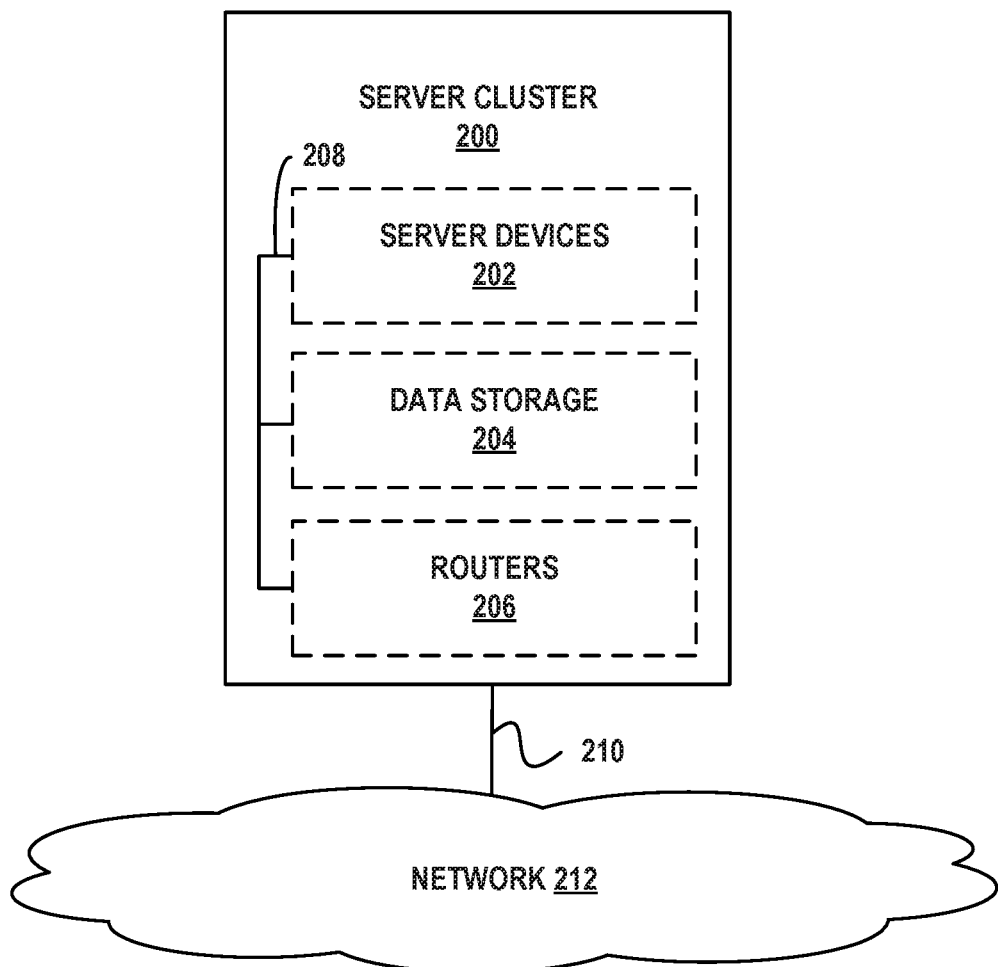
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
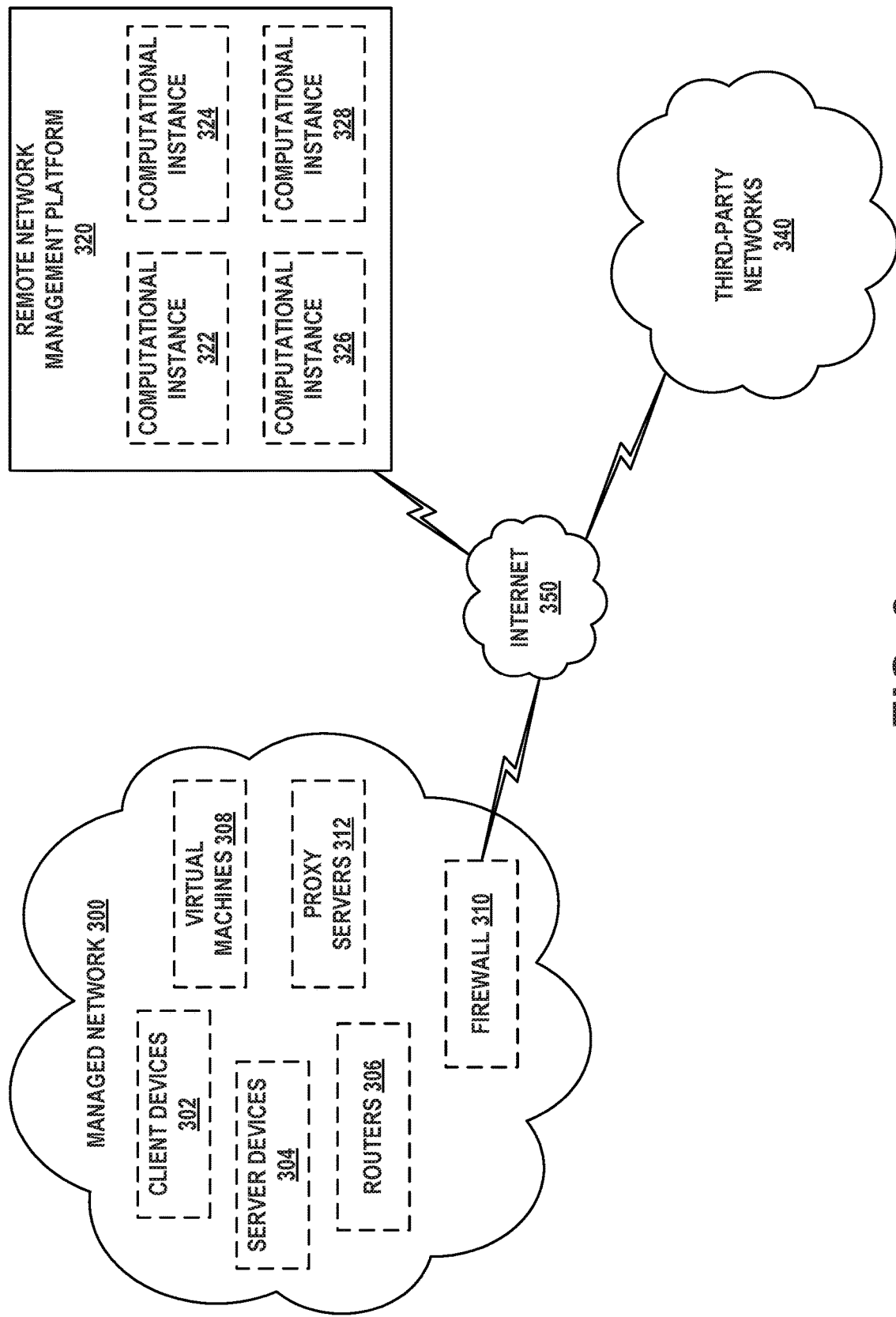
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
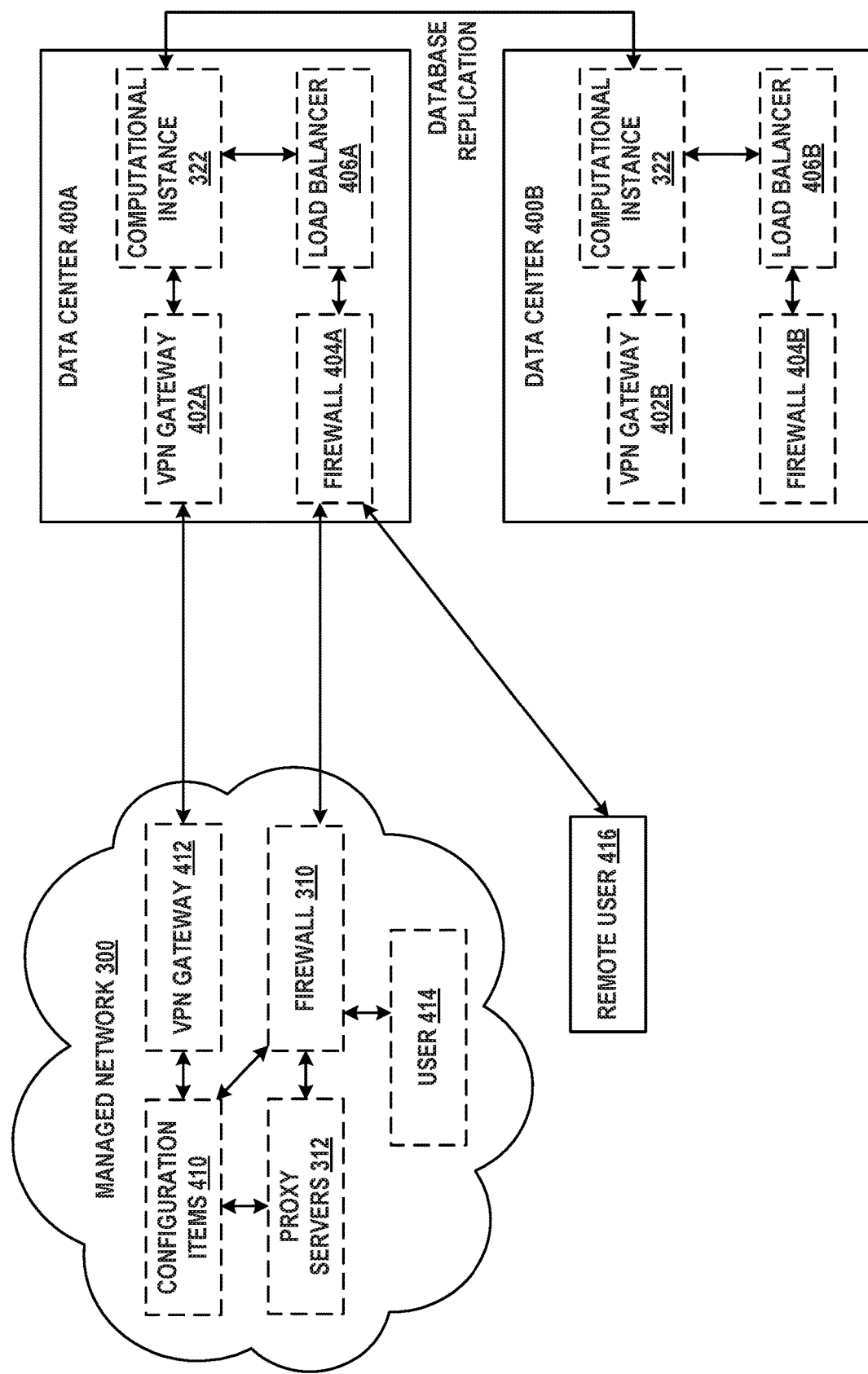
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
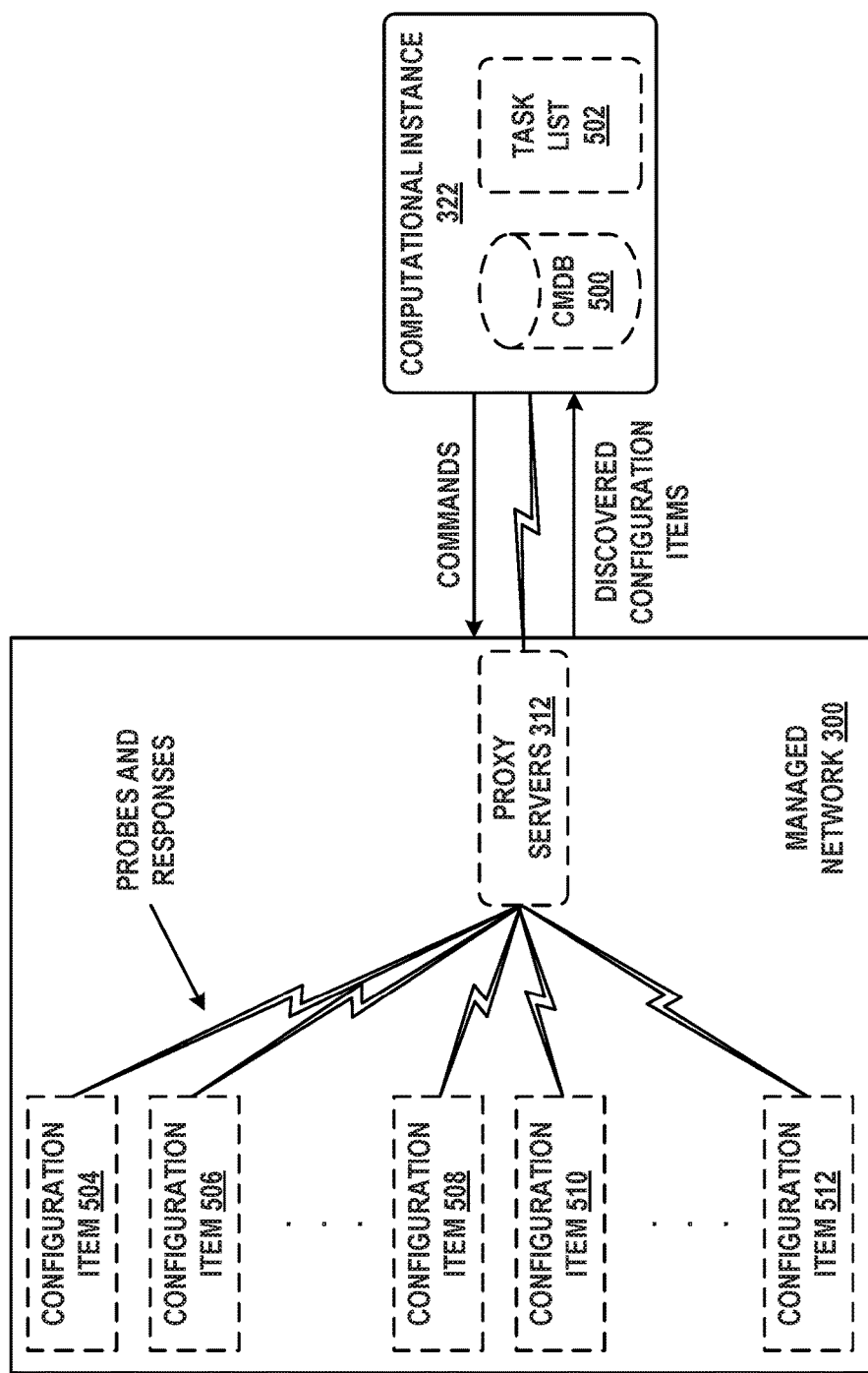
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
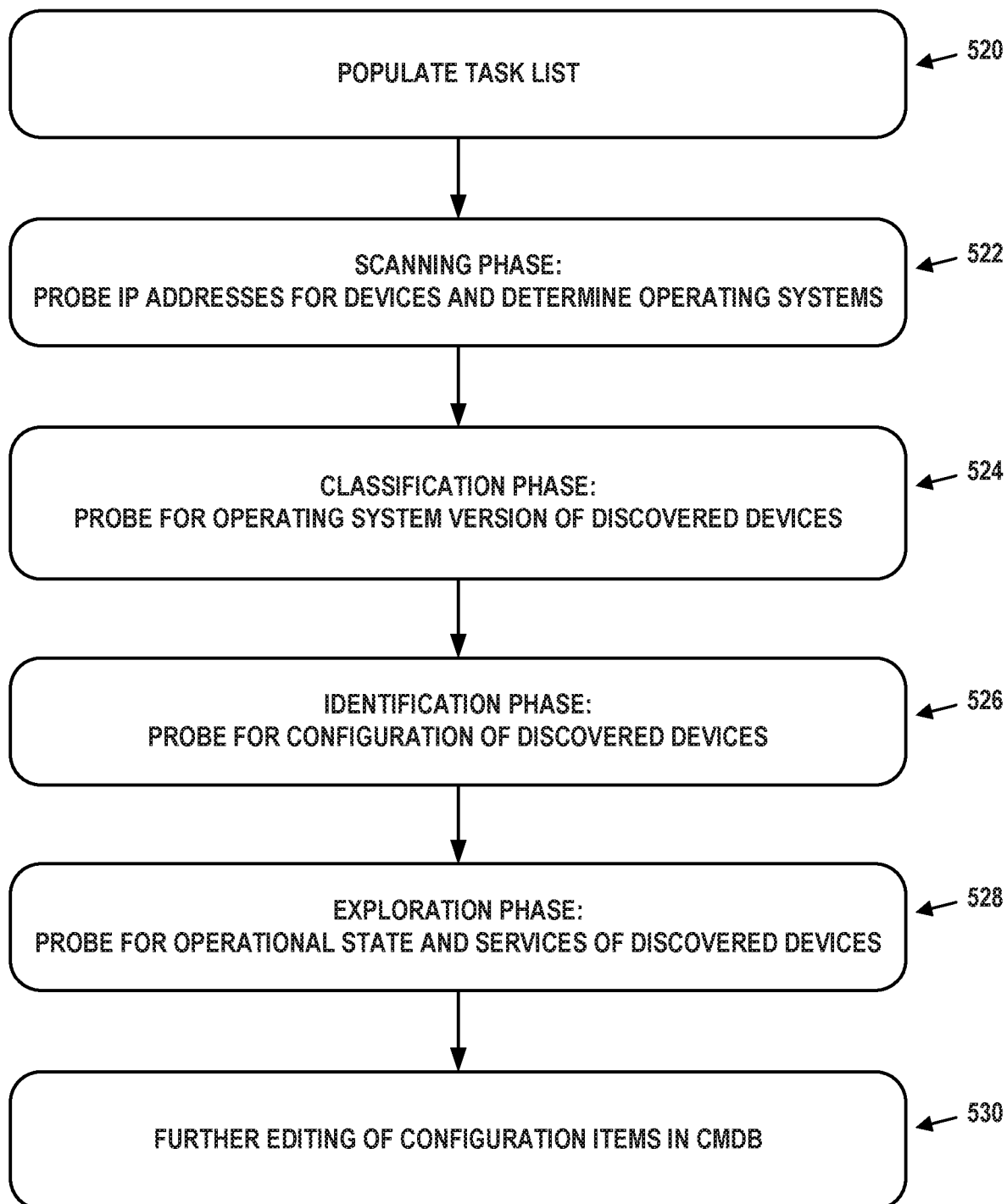
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. EXAMPLE APPLICATION SYSTEM

Managed network 300 may utilize an application system to facilitate the development, execution, hosting, and management of various software applications. The application system may be arranged into a hierarchy of partitions, spaces, and applications, and may also include other components, such as network domains and routes, that allow the application system to host software applications. However, as the size of the application system increases, managing the allocation and distribution of the various components of the application system may become increasingly complicated. For example, when the application system hosts hundreds or thousands of software applications across tens or hundreds of spaces, programmers may face difficulties in efficiently and effectively monitoring and adjusting aspects of the application system. Accordingly, a discovery application may facilitate management of the application system by allowing for discovering, mapping, and/or making adjustments to various aspects of the application system.

Figure 6A:
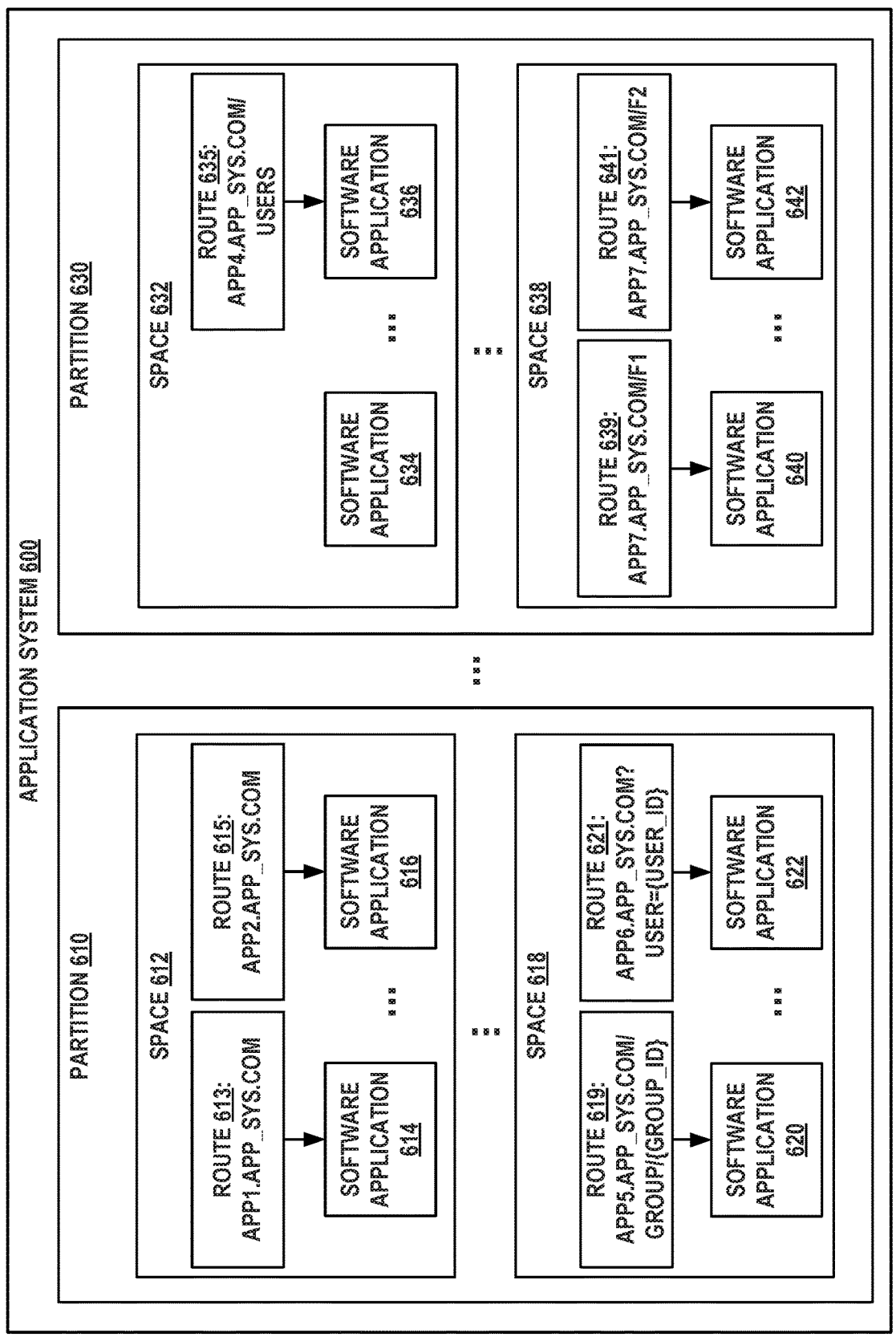
FIG. 6A depicts an application system, in accordance with example embodiments.

FIG. 6A illustrates an example architecture of application system 600. In some cases, application system 600 may represent a system that provides both the software environment and the hardware infrastructure for developing, executing, and managing software applications. In other cases, application system 600 may represent the software environment that can be executed and/or hosted by a separate infrastructure system that provides the hardware. Namely, application system 600 and the underlying infrastructure system on which application system 600 is executed may each be provided by a different provider or entity. For example, application system 600 may represent, among other possibilities, the Platform-as-a-Service CLOUD FOUNDRY®, which may be hosted by one or more of AMAZON WEB SERVICES®, MICROSOFT® AZURE®, or GOOGLE CLOUD PLATFORM®, among other possibilities.

Application system 600 may be divided into a plurality of partitions 610 through 630. Each partition may include therein one or more spaces. Namely, partition 610 includes therein spaces 612 through 618 and partition 630 includes therein spaces 632 through 638. Each space may, in turn, include therein one or more software applications. That is, space 612 includes therein software applications 614 through 616, space 618 includes therein software applications 620 through 622, space 632 includes therein software applications 634 through 636, and space 638 includes therein software applications 640 through 642. The software applications may be associated with routes that define how network traffic is forwarded through application system 600. Thus, software applications 614-616, 620-622, 636, and 640-642 may be associated with routes 613-615, 619-621, 635, and 639-641, respectively.

Each respective partition of partitions 610-630 may be accessible to, modifiable by, and usable by one or more users (as defined by, e.g., user accounts or other identifiers) associated with the respective partition. The number of partitions and the amount of computing resources provided by each partition may be defined by managed network 300, the enterprise associated therewith, and/or the programmers associated with the enterprise based on various factors. For example, each department, division, or organization of the enterprise associated with managed network 300 may be provided with a separate partition. Accordingly, in some implementations, each of partitions 610-630 may alternatively be referred to as sectors, segments, organizations, or other analogous names.

Each of partitions 610-630 may be associated with a respective computing resource quota. For example, the infrastructure system on which application system 600 is executing may provide a predetermined amount of computing resources to and/or on behalf of managed network 300. Accordingly, managed network 300 may distribute this predetermined amount of computing resources among partitions 610-630 by specifying the respective computing resource quotas thereof. The computing resource quota may specify, for example, a number of physical and/or virtual processors (e.g., general-purpose processors or graphics processing units) allocated to the partition, a number of physical and/or virtual computing devices allocated to the partition, an amount of memory and/or cache memory allocated to the partition, an amount of storage available to the partition, and/or a network bandwidth allocated to applications within the partition, among other possibilities.

The spaces within a particular partition may share the computing resource quota of the particular partition. Thus, each of spaces 612-618 may share the computing resource quota of partition 610, and each of spaces 632-638 may share the computing resource quota of partition 630. One or more of spaces 612-618 and 632-638 may also have a corresponding computing resource quota. The computing resource quota of a respective space may define how much of the computing resources of the corresponding partition the respective space may utilize, thus preventing a single space from using all the resources of the corresponding partition. Notably, application system 600 may be configured to manage the allocation of computing resources among partitions 610-630 and spaces 612-618 and 632-638, thus preventing overuse of computing resources by any single component.

Each space may provide a computing environment that may be isolated from the computing environments of other spaces. Thus, for example, software applications 614-616 may be executed in a different computing environment than software applications 620-622, 634-636, and/or 640-642. A computing environment may be defined by the virtual and/or physical computing devices that define a respective space, the operating system provided by such devices, the software libraries available in the computing environment, the compilers and/or interpreters available in the computing environment, and/or the programming languages supported by the computing environment, among other possibilities.

The number of spaces and any computing resource quota of a given space may be defined by managed network 300, the enterprise associated therewith, and/or the programmers associated with the enterprise based on various factors. Spaces may be used to further subdivide each department, division, or organization of the enterprise associated with managed network 300. For example, partition 610 may be allocated to a particular segment of the enterprise, while one or more of spaces 612-618 may be allocated to a corresponding sub-section (e.g., department) within the particular segment. In another example, different spaces may be used to provide computing environments to be used at different stages in the software development process. Namely, space 612 may be used to provide a staging environment in which software application may be tested, while space 618 may be used to provide a release environment in which final versions of the software are executed and exposed to computing devices outside of application system 600.

Application system 600 may direct traffic to the various software applications therein based on routes. Each route may be a URL or a portion thereof that is associated by application system 600 with a corresponding software application. Thus, software applications associated with corresponding one or more routes may be accessible to other software applications within application system 600 and to computing devices outside of application system 600. On the other hand, software applications that are not associated with at least one route (e.g., software application 634) might not be accessible by at least some computing devices in and/or outside of application system 600.

In general, a route may include one or more of (i) a top-level domain, (ii) at least one sub-domain, and (iii) one or more URL parameters, such as resource path parameters and/or query parameters. Thus, software application 614 may be accessible by transmitting a request (e.g., an HTTP request) addressed to "APP1.APP_SYS.COM" or to another URL that includes therein additional parameters (e.g., "APP1.APP_SYS.COM/PARAM1?PARAM2=VALUE2"), where PARAM1 represents a resource path parameter and PARAM2 represents a query parameter. That is, a request may be routed to a particular application when the URL to which the request is addressed includes therein at least the URL of the route associated with the particular application. The additional URL parameters of the URL to which the request is addressed may, for example, specify a particular function of the software application and/or provide inputs to the software application.

Similarly, software applications 616, 636, 620, 622, 640, and 642 may be accessible by transmitting requests addressed to "APP2.APP_SYS.COM", "APP4.APP_SYS.COM/USERS", "APP5.APP_SYS.COM/GROUP/{GROUP_ID}", "APP6.APP_SYS.COM/?USER={USER_ID}", "APP7.APP_SYS.COM/F1", "APP7.APP_SYS.COM/F2" or to other respective URLs that include therein additional parameters. Notably, routes 635, 619, 639, and 641 include therein resource path parameters. Thus, in the case of route 635, for example, a request addressed to "APP4.APP_SYS.COM/USERS" may be routed to software application 636, but a request addressed to "APP4.APP_SYS.COM" might not be routed to software application 636. Similarly, route 621 includes therein a query parameter. Thus, requests that include this query parameter and the value thereof may be routed to software application 622, while other requests might not. Routes 619 and 621 indicate that values are to be substituted for {GROUP_ID} (a resource path parameter) and {USER_ID} (a query parameter), respectively, in order to reach software applications 620 and 622, respectively.

Each space may be associated with the routes assigned to the applications in that space. Thus, space 612 may be associated with routes 613-615, space 618 with routes 619-621, space 632 with route 635, and space 638 with routes 639-641. Similarly, each partition may be associated with the domains from which routes are generated. Thus, partition 610 may be associated with domains "APP1.APP_SYS.COM", "APP2.APP_SYS.COM", "APP5.APP_SYS.COM", and "APP6.APP_SYS.COM". Likewise, partition 630 may be associated with domains "APP4.APP_SYS.COM" and "APP7.APP_SYS.COM".

Requests addressed to URLs that include therein one of the domains of application system 600 may be resolved by the DNS to an IP address of a load balancer provided by application system 600. The load balancer may be configured to match the URLs associated with incoming requests against the available routes and thus direct network traffic accordingly. For example, a request addressed to "APP7.APP_SYS.COM/F1/987" may first be resolved to an IP address of the load balancer based on the "APP7.APP_SYS.COM" portion of the URL. The load balancer may then determine that the "APP7.APP_SYS.COM/F1" portion of the URL matches route 639 associated with software application 640, and thus direct the request thereto. Notably, the portion "/987" of the URL may specify an input to function "F1" of software application 640. In some implementations, one load balancer may be provided to distribute traffic among multiple partitions (e.g., 610-630). In other implementations, each of partitions 610-630 may be allocated a separate load balancer.

Figure 6B:
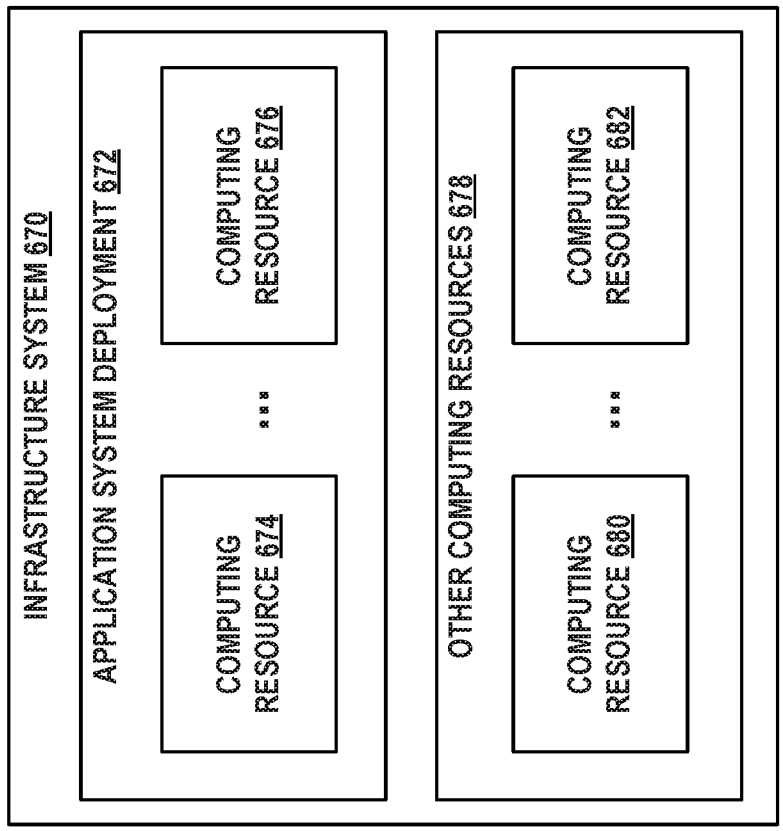
FIG. 6B depicts an infrastructure system, in accordance with example embodiments.
Figure 6B:
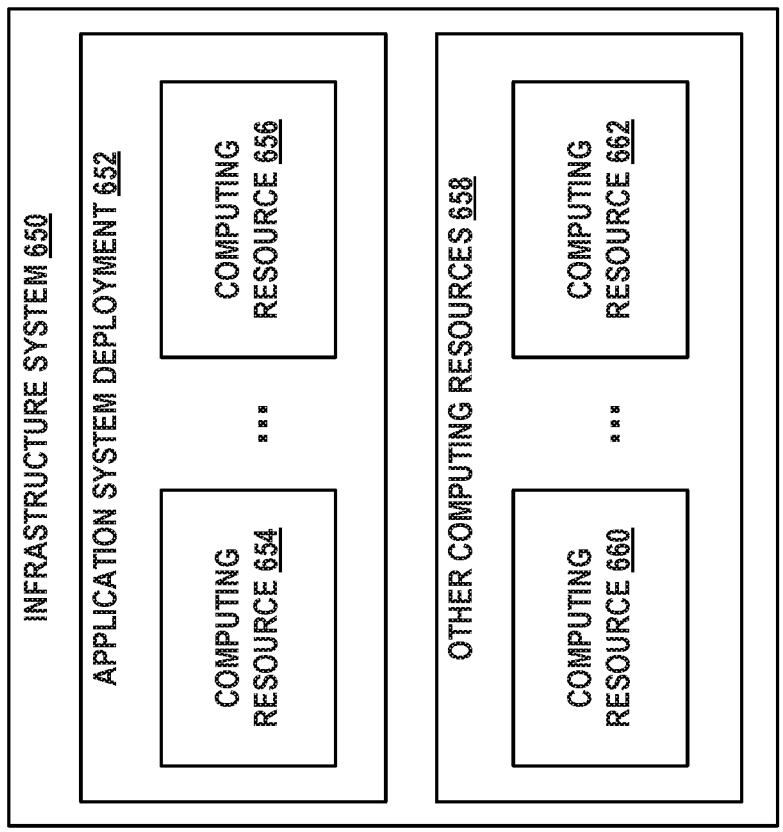

FIG. 6B illustrates application system 600 deployed across multiple different infrastructure systems. Namely, application system 600 may be deployed for execution on infrastructure system 650 and infrastructure system 670, each of which may be Infrastructure-as-as-Service systems provided by different service providers. Infrastructure system 650 may include deployment 652 of application system 600 and infrastructure system 670 may include deployment 672 of application system 600. Each deployment may represent an executing copy of the software that defines application system 600.

Infrastructure systems 650 and 670 may provide computing resources on behalf of managed network 300. Accordingly, a portion of these computing resources may be used to execute and host deployments 652 and 672. Namely, execution of deployment 652 may be supported by computing resources 654-656 and execution of deployment 672 may be supported by computing resources 674-676. Notably, each of infrastructure systems 650 and 670 may also provide other computing resources 658 and 678, respectively, which are not allocated to deployments 652 and/or 672. Other computing resources 658 may include computing resources 660-662 and other computing resources 678 may include computing resources 680-682. Computing resources 660-662 and 680-682 may be used to execute and host, on behalf of managed network 300, applications and/or systems other than application system 600.

Computing resources 654-656 and 674-676 may each include two groups of computing resources. A first group of the two groups may include computing resources that execute the application system deployment itself, allowing managed network 300 to deploy applications to the application system. A second group of the two groups may include computing resources that make up the partitions and spaces and host the software applications of the application systems. The first group of computing resources may allow application system 600 to provide a uniform computing environment and experience across a plurality of different infrastructure systems (e.g., 650 and 670), while the second group may operate to host the software applications on behalf of managed network 300.

VII. EXAMPLE DISCOVERY APPLICATION OPERATIONS

Figure 7:
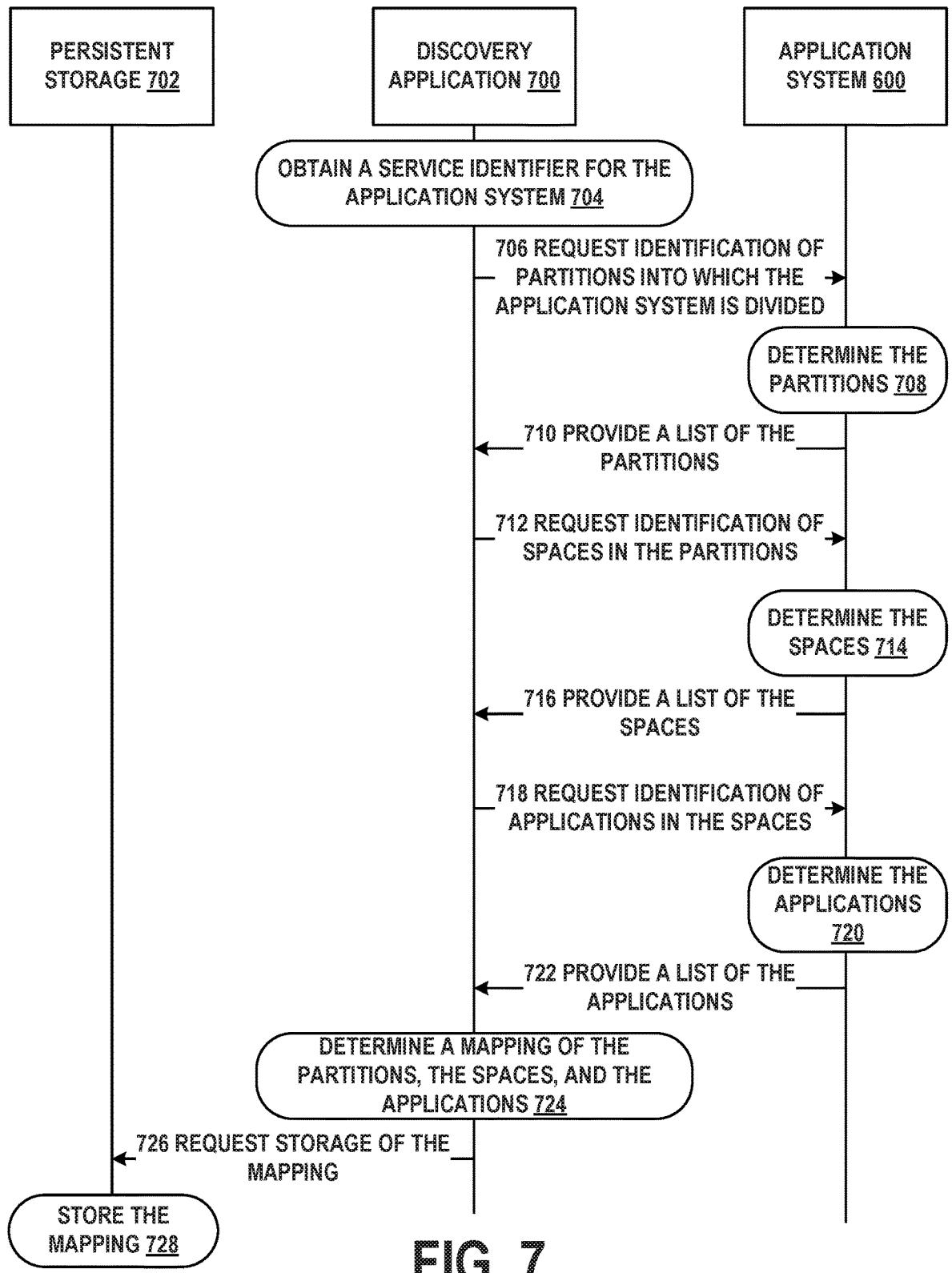
FIG. 7 is a message diagram, in accordance with example embodiments.

FIG. 7 illustrates a message flow diagram of operations involved in discovering and mapping elements of an application system. Specifically, FIG. 7 illustrates discovery application 700, persistent storage 702, and application system 600. Persistent storage 702 may, in some implementations, include and/or take the form of a database. In one example, discovery application 700 and persistent storage 702 may be disposed in or form part of a computational instance (e.g., computational instance 322) of remote network management platform 320. This computational instance may be assigned to managed network 300, and thus used to discover, map, and/or adjust various systems associated therewith. To that end, discovery application 700 may be configured to communicate with application system 600 over a network such as the Internet.

Discovery application 700 may initiate the discovery and mapping process by obtaining a service identifier for application system 600, as indicated by block 704. The service identifier may include a username and password combination, a web token (e.g., a JSON Web Token), or another form of credentials that allows discovery application 700 to connect to and obtain information regarding application system 600. The service identifier may also include or be associated with a URL, or another identifier, that addresses application system 600. The service identifier may thus also allow discovery application 700 to disambiguate application system 600 from other available application systems or deployments thereof. In some implementations, discovery application 700 may obtain the service identifier by way of a user interface.

Based on or in response to obtaining the service identifier at block 704, discovery application 700 may be configured to request identification of one or more partitions into which application system 600 is divided, as indicated by arrow 706. This request, as well as some subsequent requests to application system 600, may take on a plurality of different forms or formats. In one example, application system 600 may provide an API configured to generate and provide the information requested by discovery application 700. The API may be, for example, a representational state transfer (REST) API accessible by way of HTTP requests and configured to provide the requested information in HTTP responses.

The request at arrow 706 may thus specify one or more of (i) a base address of the API, (ii) a specific function of the API configured to provide the requested information, (iii) input values for the specific function of the API, and/or (iv) portions of the service identifier that authenticate discovery application 700. For example, the request at arrow 706 may be transmitted to "APP_SYS.COM/PARTITIONS", where "APP_SYS.COM" represents the base address of the API and "/PARTITIONS" specifies the function of the API. The request may contain in HTTP headers thereof the authentication credentials from the service identifier obtained at block 704.

In other examples, the API may be accessible by way of other interfaces or communication protocols. For example, the API may be accessible by way of a secure shell (SSH) connection. Namely, after establishing an SSH connection with application system 600, discovery application may be configured to invoke execution of various functions of the API by way of a command line interface (CLI). Other interfaces, protocols, standards, and formats are possible.

Based on or in response to reception of the request at arrow 706, application system 600 may be configured to determine the partitions into which the application system is divided, as indicated by block 708. As indicated above, the determination may be made by one or more functions of an API provided by application system 600. This function may determine the partitions that are associated with the service identifier or portion thereof (e.g., authentication credentials) provided as part of the request at arrow 706. That is, the function may determine, for example, the partitions associated with managed network 300, but not the partitions associated with other managed networks that also utilize application system 600.

Based on or in response to determining the partitions, application system 600 may be configured to transmit, to discovery application 700, a list of the determined partitions, as indicated by arrow 710. The list may include, for example, identifiers (e.g., names and/or unique identifiers (UIDs)) of each of partitions 610-630 shown in FIG. 6A. The list may also indicate, for each respective partitions of partitions 610-630, a URL associated with the respective partition (e.g., a URL used to access the partition, rather than the components thereof) and an operational status (e.g., active, suspended, etc.) of the respective partition, among other attributes. The list may further indicate, for each respective partitions of partitions 610-630, the computing resource quota of the respective partition and the portion of that quota used by the spaces within the respective partition (e.g., at the time of discovery). Alternatively, in some implementations, some of these attributes of the partitions may be obtainable from application system 600 by way of additional and separate API queries to API functions of application system 600.

Based on or in response to reception of the list of the partitions at arrow 710, discovery application 700 may be configured to request identification of one or more spaces in the partitions, as indicated by arrow 712. Based on or in response to reception of the request at arrow 712, application system 600 may be configured to determine (e.g., by way of an API function) the one or more spaces, as indicated by block 714. Based on or in response to determining the one or more spaces, application system 600 may be configured to transmit, to discovery application 700, a list of the spaces, as indicated by arrow 716. Notably, in some implementations, the operations of arrows 712-722 may be scoped to a subset of the partitions identified by the list at arrow 710, such that the subcomponents of some, but not all, partitions are discovered and mapped.

In one implementation, the operations of arrows 712-716 may obtain the list of spaces through one iteration of these operations. That is, the request at arrow 712 may indicate that application system 600 is to provide a list of all the spaces associated with any of the partitions identified at block 708. For example, the request at arrow 712 may be addressed to "APP_SYS.COM/SPACES", which may invoke an API function that returns all spaces (e.g., 612-618 and 632-638) associated with the service identifier. Based on the attributes associated with each identified space and partition, the space may be related and/or mapped to a corresponding one of the partitions determined at block 708.

In another implementation, the operations of arrow 712-716 may be executed once for each partition identified at block 708. Thus, referring back to FIG. 6A, discovery application 700 may first request identification of the spaces in partition 610 (e.g., by transmitting a request to "APP_SYS.COM/PARTITIONS/610/SPACES"), in response to which application system 600 may identify spaces 612-618. Discovery application 700 may subsequently request identification of the spaces in other partitions (e.g., in partition 630, by transmitting a request to "APP_SYS.COM/PARTITIONS/630/SPACES"), in response to which application system 600 may identify the spaces therein (e.g., 632-638). Each space may thus be related and/or mapped to its corresponding partition without needing to rely on the attributes of the partitions or spaces. Other implementations are also possible.

Based on or in response to reception of the list of spaces at arrow 716, discovery application 700 may be configured to request identification of one or more software applications in the spaces, as indicated by arrow 718. Based on or in response to reception of the request at arrow 718, application system 600 may be configured to determine the software applications in each of the spaces, as indicated by block 720. Based on or in response to determining the applications at block 720, application system 600 may be configured to transmit, to discovery application 700, a list of the software applications, as indicated by arrow 722. The list may include a name of the space, a unique identifier of the space, and/or a URL used to access the space (rather than the applications therein), among other possible attributes of the space.

Similarly to the operations of arrows 712-716, the operations of arrows 718-722 may be executed separately for the applications in each of the spaces indicated at arrow 716, or the operations may obtain the information regarding all of these applications with a single iteration. Thus, a given software application may be related or mapped to a particular space based on which query (i.e., corresponding to which space) resulted in that application's attributes being provided in a response, or based on the attributes themselves. In some implementations, however, both the attributes and the query-response relationships may be used in combination to relate or map the various components of application system 600 to one another.

Based on or in response to reception of the list at arrow 722 (or reception of other information from application system 600), discovery application 700 may be configured to determine a mapping of the partitions, the spaces, and the applications, as indicated by block 724. The mapping may indicate a distribution of the one or more spaces among the one or more partitions and a distribution of the one or more software applications among the one or more spaces. The mapping may additionally indicate that each of the partitions is a subset of the service identifier (or an account associated with the service identifier).

Each of the service identifier, the partitions, the spaces, and the software applications may be identified in the mapping as a node. A relationship between two nodes may be indicated with a line, edge, or other connection between nodes. Partition nodes may be indicated as child nodes of the service identifier node (e.g., by way of an arrow associated with the line, edge, or other connection), which may sometimes be referred to as a foundation node. Space nodes may be indicated as child nodes of the partition nodes, and the application nodes may, in turn, be indicated as child nodes of the space nodes. The mapping may be visually rendered to illustrate the relationships among these components. Accordingly, a visual representation of the mapping may be analogous or similar to FIG. 6A.

Based on or in response to determination of the mapping at block 724, discovery application may be configured to request, from persistent storage 702, storage of the mapping, as indicated by arrow 726. Based on or in response to the request at arrow 726, persistent storage 702 may be configured to store the mapping as indicated by block 728. The mapping may thus be retrievable by other applications and devices to visualize the state of application system 600 and the components thereof.

Discovery application 700 may also be configured to determine the attributes of a plurality of additional components of application system 600 and the relationships of these additional components with the partitions, spaces, and applications. Namely, discovery application 700 may query application system 600 to determine (i) the routes associated with each space and (ii) the software applications that correspond to each route. This query, like queries 706, 712, and 718, may take the form of a request transmitted to a function of an API of application system 600 configured to provide the requested data. The relationship between the routes and applications may be included in the mapping determined at block 724, and may thus be visually illustrated in a manner similar to that shown in FIG. 6A. Accordingly, the mapping may allow applications and users to easily determine how to access a particular software application hosted by application system 600. Similarly, discovery application 700 may query application system 600 to determine the domains associated with each partition, and may reflect this information in the mapping.

Discovery application 700 may also be configured to maintain the mapping in synchrony with the actual state of application system 600. In one implementation, discovery application 700 may be configured to periodically (e.g., hourly, daily, weekly, etc.) repeat at least a portion of the operations of FIG. 7 to update the mapping of block 724. This approach may involve rediscovering and collecting the attributes of components that have not changed since the last iteration of discovery and mapping, and storing the updated mapping.

Accordingly, in another implementation, discovery application 700 may be configured to update the mapping based on or in response to one or more modifications to the state of application system 600. For example, application system 600 may be configured to generate a notification each time a particular type of modification takes place. The types of modifications that trigger generation of a notification and/or the minimum threshold of the modification (e.g., number of modified software applications) that triggers generation of the notification may be configurable by discovery application 700 or a user thereof. The notification may be transmitted by application system 600 to discovery application 700.

Based on or in response to reception of such a notification, discovery application 700 may be configured to obtain, from application system 600, updated information regarding the components of application system 600, and update the mapping based on this updated information. In some cases, the entirety of application system 600 may be remapped based on the notification. Alternatively, when the notification identifies the modification and/or the specific component of application system 600 that was modified, discovery application 700 may be configured to target the rediscovery process at the modification and/or the modified component. For example, when the notification indicates that the modification was a deletion of software application 640, discovery application 700 may obtain updated information regarding the software applications and routes in space 638, but might not obtain information regarding components of other spaces. Such notification-based rediscovery may allow the mapping to be updated as changes are made without necessitating rediscovery of the entirety of application system 600.

In some implementations, discovery application 700 may be configured to make one or more modifications to application system 600. For example, a user may interact with a visual rendering of the mapping of application system 600 to modify one or more aspects thereof (e.g., increase the quota of a particular partition). Based on this interaction, discovery application 700 may transmit, to application system 600, a request for modification of the one or more aspects thereof. Discovery application 700 may subsequently obtain updated information regarding the one or more modified aspects of application system 600 to verify that the modification has been carried out as requested. That is, discovery application 700 may re-perform some or all of the discovery procedure to determine whether the change was successful.

Discovery application 700 may also be configured to determine a relationship between (i) application system 600 and (ii) the underlying infrastructure system that executes application system 600. In implementations where application system 600 and the infrastructure system are provided by the same entity or provider, such a relationship may be determined based on information obtained from the API of application system 600. Namely, discovery application 700 may transmit, to application system 600, requests for identification of the computing resources of the infrastructure system that host the components of application system 600. In response, application system 600 may generate such information and provide it to discovery application system 700, which may use it to further modify the mapping to reflect this information.

In implementations where application system 600 and the infrastructure systems are separate systems provided by different entities or providers, each system may be separately discovered and mapped by a corresponding discovery pattern or process. For example, a first discovery pattern may discover and map components of application system 600, while a second different discovery pattern may discover and map the computing resources of the infrastructure system. One of the first or the second discovery pattern (or a third different discovery pattern) may be configured to generate a combined mapping that illustrates how the components of application system 600 are distributed among the computing resources of the infrastructure system.

Such a combined mapping may be similar to FIG. 6B in that it may show, for example, computing resources 654-656 as allocated to application system deployment 652. Additionally, these computing resources may also be associated with particular partitions, spaces, and/or applications of the application system deployment. For example, a particular computing resource (e.g., a virtual computing device) may be a subset of particular a partition and a particular space, and may also include as its subset one or more software applications. The combined mapping may thus indicate how the computing resources of the infrastructure system are allocated to host the different components of application system 600.

The components of application system 600 and the computing resources of the infrastructure system may be mapped to one another based on the attributed obtained by discovery application 700. For example, a software application may be determined to be hosted by a particular virtual computing device on the basis of the virtual computing device's host name, IP address, or another unique identifier that may be obtainable by both the first and the second discovery patterns. That particular virtual computing device may, in turn, be mapped to the corresponding space and partition of which the software application (hosted by the particular virtual computing device) is a subset. Thus, the mapping may indicate the computing resources that provide the various spaces and partitions.

Notably, the number and depth of relationships that are determined may depend on the extent of detail available regarding each computing resource of the infrastructure system and each component of application system 600. Namely, a detailed list of attributes of the components of application system 600 and the underlying infrastructure system may allow for generation of a detailed map, while a sparse list of attributes may allow for determination of more general relationships. In other implementations, components of application system 600 and the computing resources of the infrastructure system may be mapped to one another based on monitoring network traffic therebetween and/or analyzing the programmatic code of the software applications, among other possibilities.

Further, in some implementations, the components of application system 600 may also be mapped to various physical components of the infrastructure system. For example, a software application may be mapped to a corresponding physical computing device of the infrastructure system based on that physical computing device hosting the virtual computing device in which the software application is executing. Similarly, applications, spaces, and partitions may be mapped to a particular geographic region of the infrastructure system, an availability zone (e.g., a datacenter) within the geographic region, and/or a cluster of one or more physical and/or virtual computing devices, among other possibilities.

In some implementations, each deployment of application system 600 may utilize a first group of computing resources (e.g., virtual computing devices) for providing the partitions and spaces across different infrastructure systems. Each deployment may also utilize a second group of computing resources for providing the runtime computing environments for the software applications. Thus, the first group of computing resources may execute application system 600 itself, thereby providing the structure and services that can be used to deploy software applications. The second group of computing resources may, in turn, be dedicated to executing the software applications within the structure provided by the first group.

In some cases, discovery application may be configured to discover the computing resources of the first and second groups, and include these in the mapping. For example, computing resources of the first group may be indicated as parent nodes of their corresponding partitions, while computing resources of the second group may be indicated as parent nodes of their corresponding software applications. In this way, the mapping may additionally indicate the overhead cost associated with hosting software applications on application system 600, rather than deploying these applications independently of application system 600.

VIII. ADDITIONAL EXAMPLE OPERATIONS

Figure 8:
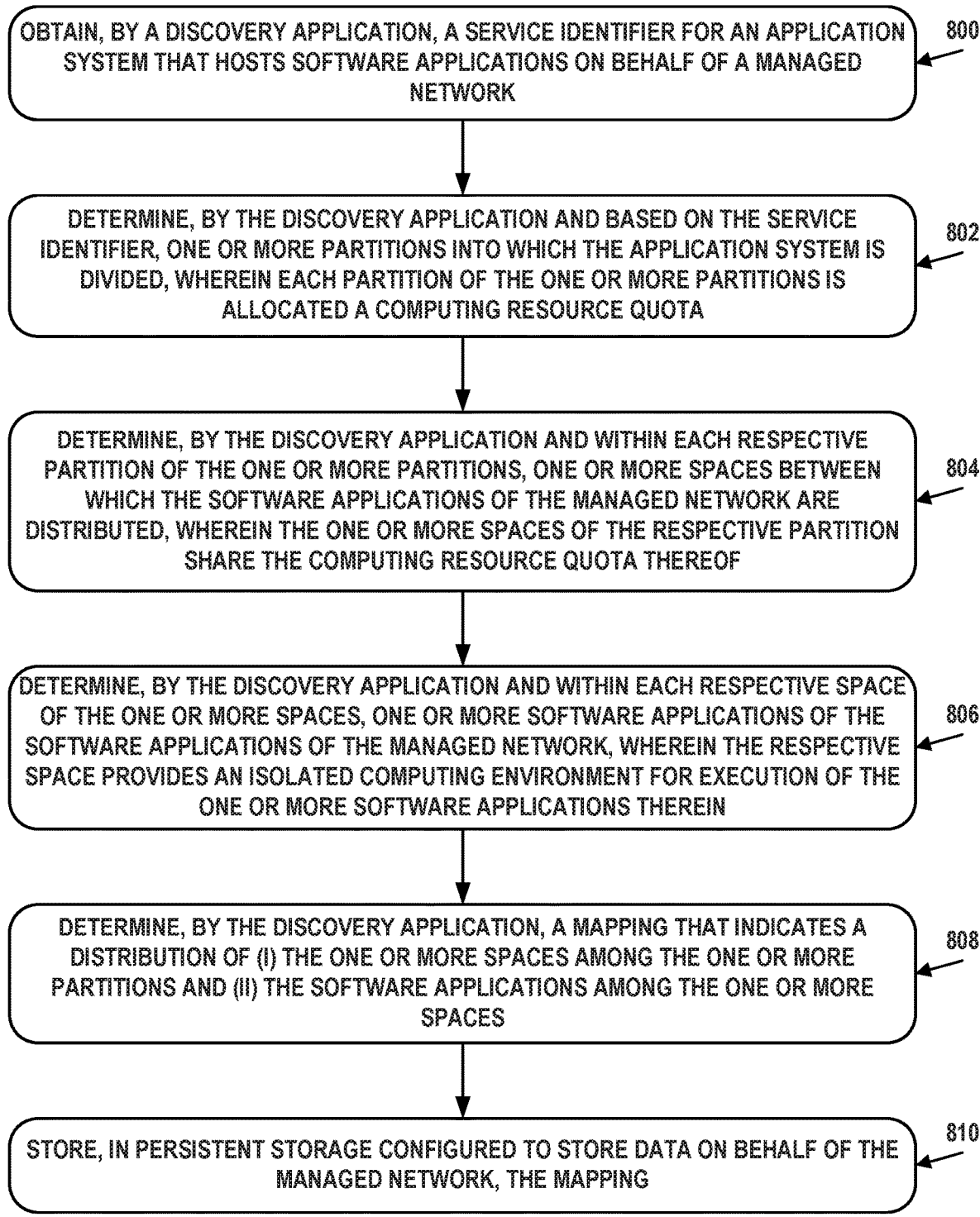
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining, by a discovery application, a service identifier for an application system that hosts software applications on behalf of a managed network.

Block 802 may involve determining, by the discovery application and based on the service identifier, one or more partitions into which the application system is divided. Each partition of the one or more partitions may be allocated a computing resource quota.

Block 804 may involve determining, by the discovery application and within each respective partition of the one or more partitions, one or more spaces between which the software applications of the managed network are distributed. The one or more spaces of the respective partition may share the computing resource quota thereof.

Block 806 may involve determining, by the discovery application and within each respective space of the one or more spaces, one or more software applications of the software applications of the managed network. The respective space may provide an isolated computing environment for execution of the one or more software applications therein.

Block 808 may involve determining, by the discovery application, a mapping that indicates a distribution of (i) the one or more spaces among the one or more partitions and (ii) the software applications among the one or more spaces.

Block 810 may involve storing, in persistent storage configured to store data on behalf of the managed network, the mapping.

In some embodiments, the application system may be hosted by an infrastructure system configured to provide computing resources on behalf of the managed network. The one or more partitions, the one or more spaces, and the software applications may be distributed among a subset of the computing resources of the infrastructure system.

In some embodiments, a cluster to which the one or more partitions belong may be determined based on the service identifier. The cluster may represent the subset of the computing resources of the infrastructure system. The mapping may be determined such that it additionally indicates that the one or more partitions belong to the cluster.

In some embodiments, a second distribution may be determined of at least one of (i) the one or more partitions, (ii) the one or more spaces, or (iii) the software applications among the subset of the computing resources of the infrastructure system. The mapping may be determined such that it additionally indicates the second distribution.

In some embodiments, the application system may include (i) a first group of one or more virtual computing devices configured to provide the one or more partitions and the one or more spaces across a plurality of different infrastructure systems and (ii) a second group of one or more virtual computing devices configured to provide a runtime computing environment for the software applications. The one or more virtual computing devices of the first group may be identified by the discovery application. The mapping may be determined such that it indicates that the one or more virtual computing devices of the first group provide the one or more partitions and the one or more spaces.

In some embodiments, the application system may include (i) a first group of one or more virtual computing devices configured to provide the one or more partitions and the one or more spaces across a plurality of different infrastructure systems and (ii) a second group of one or more virtual computing devices configured to provide a runtime computing environment for the software applications. The one or more virtual computing devices of the second group may be identified by the discovery application. A second distribution of the software applications across the one or more virtual computing devices of the second group may also be determined by the discovery application. The mapping may be determined such that it additionally indicates the second distribution.

In some embodiments, the discovery application may be configured to determine, within each respective space of the one or more spaces, one or more routes for accessing the one or more software applications of the respective space. The application system may be configured to match a URL associated with an incoming request against the one or more routes to identify a corresponding software application for which the incoming request is addressed. The mapping may be determined such that it additionally indicates, for each respective route of the one or more routes, the corresponding software application to which the respective route leads.

In some embodiments, the discovery application may be configured to determine, for each respective partition of the one or more partitions, one or more domains associated with the respective partition. Each route of the one or more routes may be based on a corresponding domain of the one or more domains. Each respective domain of the one or more domains may resolve to an Internet Protocol address of a corresponding load balancer of the application system. The corresponding load balancer may be configured to match the URL associated with the incoming request against the one or more routes. The mapping may be determined such that it additionally indicates, for each respective partition of the one or more partitions, the one or more domains associated with the respective partition.

In some embodiments, determining the one or more partitions into which the application system is divided may involve determining, for each respective partition of the one or more partitions, the computing resource quota allocated to the respective partition. The discovery application may also be configured to determine, for each respective partition of the one or more partitions, a portion of the computing resource quota used by the one or more spaces of the respective partition. The mapping may be determined such that it additionally indicates the portion of the computing resource quota used by each respective partition.

In some embodiments, determining at least one of (i) the one or more partitions, (ii) the one or more spaces, or (iii) the one or more software applications may include generating an HTTP request that (i) specifies, by way of one or more HTTP parameters, a function of an API provided by the application system and (ii) includes authentication credentials for interacting with the API. The HTTP request may be transmitted to the application system. An HTTP response that contains an output of the function may be received from the application system. The output may identify the at least one of (i) the one or more partitions, (ii) the one or more spaces, or (iii) the one or more software applications.

In some embodiments, the service identifier may provide access to a plurality of partitions into which the application system is divided. Determining the one or more partitions may involve receiving selection of the one or more partitions from the plurality of partitions to define a scope of discovery and obtaining, from the application system, attributes of the one or more partitions that were selected.

In some embodiments, the discovery application may be configured to obtain, from the application system, data indicative of one or more modifications to at least one of (i) the one or more partitions, (ii) the one or more spaces, or (iii) the one or more software applications. The mapping may be updated to indicate the one or more modifications. The mapping as updated may be stored in the persistent storage.

In some embodiments, the data indicative of the one or more modifications may be obtained by the discovery application according to a predefined schedule.

In some embodiments, the data indicative of the one or more modifications may be obtained by the discovery application in response to reception, from the application system, of a notification indicating the one or more modifications.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
  persistent storage configured to store data on behalf of a managed network, wherein an application system hosts software applications on behalf of the managed network, and wherein the application system is hosted by an infrastructure system configured to provide computing resources on behalf of the managed network; and
  a discovery application configured to perform operations comprising:
    obtaining a service identifier for the application system;
    determining, based on the service identifier, a cluster to which one or more partitions belong, wherein the cluster represents a subset of computing resources of the infrastructure system;
    determining, within the cluster, the one or more partitions into which the application system is divided, wherein each partition of the one or more partitions is allocated a computing resource quota;
    determining, within each respective partition of the one or more partitions, one or more spaces between which the software applications of the managed network are distributed, wherein the one or more spaces of the respective partition share the computing resource quota thereof;
    determining, within each respective space of the one or more spaces, one or more software applications of the software applications of the managed network, wherein the respective space provides an isolated computing environment for execution of the one or more software applications therein, wherein the one or more partitions, the one or more spaces, and the software applications are distributed among the subset of the computing resources of the infrastructure system;
    determining a mapping that indicates a distribution of (i) the one or more partitions within the cluster, (ii) the one or more spaces among the one or more partitions and (iii) the software applications among the one or more spaces; and
    storing, in the persistent storage, the mapping.

2. The computing system of claim 1, wherein the operations further comprise:
  determining a second distribution of at least one of (i) the one or more partitions, (ii) the one or more spaces, or (iii) the software applications among the subset of the computing resources of the infrastructure system; and
  determining the mapping to indicate the second distribution.

3. The computing system of claim 1, wherein the application system comprises (i) a first group of one or more virtual computing devices configured to provide the one or more partitions and the one or more spaces across a plurality of different infrastructure systems and (ii) a second group of one or more virtual computing devices configured to provide a runtime computing environment for the software applications, and wherein the operations comprise:
  identifying the one or more virtual computing devices of the first group; and
  determining the mapping to indicate that the one or more virtual computing devices of the first group provide the one or more partitions and the one or more spaces.

4. The computing system of claim 1, wherein the application system comprises (i) a first group of one or more virtual computing devices configured to provide the one or more partitions and the one or more spaces across a plurality of different infrastructure systems and (ii) a second group of one or more virtual computing devices configured to provide a runtime computing environment for the software applications, and wherein the operations comprise:
  identifying the one or more virtual computing devices of the second group;
  determining a second distribution of the software applications across the one or more virtual computing devices of the second group; and
  determining the mapping to indicate the second distribution.

5. A computing system comprising:
   persistent storage configured to store data on behalf of a managed network, wherein an application system hosts software applications on behalf of the managed network; and
   a discovery application configured to perform operations comprising:
   obtaining a service identifier for the application system;
   determining, based on the service identifier, one or more partitions into which the application system is divided, wherein each partition of the one or more partitions is allocated a computing resource quota;
   determining, within each respective partition of the one or more partitions, one or more spaces between which the software applications of the managed network are distributed, wherein the one or more spaces of the respective partition share the computing resource quota thereof;
   determining, within each respective space of the one or more spaces, one or more software applications of the software applications of the managed network, wherein the respective space provides an isolated computing environment for execution of the one or more software applications therein;
   determining, within each respective space of the one or more spaces, one or more routes for accessing the one or more software applications of the respective space, wherein the application system is configured to match a uniform resource locator (URL) associated with an incoming request against the one or more routes to identify a corresponding software application for which the incoming request is addressed;
   determining a mapping that indicates a distribution of (i) the one or more spaces among the one or more partitions, (ii) the software applications among the one or more spaces, and (iii) for each respective route of the one or more routes, the corresponding software application to which the respective route leads; and
   storing, in the persistent storage, the mapping.

6. The computing system of claim 5, wherein the operations comprise:
   determining, for each respective partition of the one or more partitions, one or more domains associated with the respective partition, wherein each route of the one or more routes is based on a corresponding domain of the one or more domains, wherein each respective domain of the one or more domains resolves to an Internet Protocol address of a corresponding load balancer of the application system, and wherein the corresponding load balancer is configured to match the URL associated with the incoming request against the one or more routes; and
   determining the mapping to indicate, for each respective partition of the one or more partitions, the one or more domains associated with the respective partition.

7. A computing system comprising:
   persistent storage configured to store data on behalf of a managed network, wherein an application system hosts software applications on behalf of the managed network; and
   a discovery application configured to perform operations comprising:
   obtaining a service identifier for the application system;
   determining, based on the service identifier, one or more partitions into which the application system is divided, wherein each partition of the one or more partitions is allocated a computing resource quota, wherein determining the one or more partitions into which the application system is divided comprises determining, for each respective partition of the one or more partitions, the computing resource quota allocated to the respective partitions;
   determining, within each respective partition of the one or more partitions, one or more spaces between which the software applications of the managed network are distributed, wherein the one or more spaces of the respective partition share the computing resource quota thereof;
   determining, for each respective partition of the one or more partitions, a portion of the computing resource quota used by the one or more spaces of the respective partition;
   determining, within each respective space of the one or more spaces, one or more software applications of the software applications of the managed network, wherein the respective space provides an isolated computing environment for execution of the one or more software applications therein;
   determining a mapping that indicates a distribution of (i) the one or more spaces among the one or more partitions and (ii) the software applications among the one or more spaces;
   determining the mapping to indicate the portion of the computing resource quota used by each respective partition; and
   storing, in the persistent storage, the mapping.

8. The computing system of claim 7, wherein determining at least one of (i) the one or more partitions, (ii) the one or more spaces, or (iii) the one or more software applications comprises:
   generating an hypertext transfer protocol (HTTP) request that (i) specifies, by way of one or more HTTP parameters, a function of an application programming interface (API) provided by the application system and (ii) includes authentication credentials for interacting with the API;
   transmitting the HTTP request to the application system; and
   receiving, from the application system, an HTTP response that contains an output of the function, wherein the output identifies the at least one of (i) the one or more partitions, (ii) the one or more spaces, or (iii) the one or more software applications.

9. The computing system of claim 7, wherein the service identifier provides access to a plurality of partitions into which the application system is divided, and wherein determining the one or more partitions comprises:
   receiving selection of the one or more partitions from the plurality of partitions to define a scope of discovery; and
   obtaining, from the application system, attributes of the one or more partitions that were selected.

10. A computing system comprising
    persistent storage configured to store data on behalf of a managed network, wherein an application system hosts software applications on behalf of the managed network; and
    a discovery application configured to perform operations comprising:
    obtaining a service identifier for the application system;
    determining, based on the service identifier, one or more partitions into which the application system is divided, wherein each partition of the one or more partitions is allocated a computing resource quota;

determining, within each respective partition of the one or more partitions, one or more spaces between which the software applications of the managed network are distributed, wherein the one or more spaces of the respective partition share the computing resource quota thereof;

determining, within each respective space of the one or more spaces, one or more software applications of the software applications of the managed network, wherein the respective space provides an isolated computing environment for execution of the one or more software applications therein;

determining a mapping that indicates a distribution of (i) the one or more spaces among the one or more partitions and (ii) the software applications among the one or more spaces;

storing, in the persistent storage, the mapping;

obtaining, from the application system, data indicative of one or more modifications to at least one of (i) the one or more partitions, (ii) the one or more spaces, or (iii) the one or more software applications;

updating the mapping to indicate the one or more modifications; and storing, in the persistent storage, the mapping as updated.

11. The computing system of claim 10, wherein the data indicative of the one or more modifications is obtained by the discovery application according to a predefined schedule.

12. The computing system of claim 10, wherein the data indicative of the one or more modifications is obtained by the discovery application in response to reception, from the application system, of a notification indicating the one or more modifications.

13. A computer-implemented method comprising:

obtaining, by a discovery application, a service identifier for an application system that hosts software applications on behalf of a managed network;

determining, by the discovery application and based on the service identifier, one or more partitions into which the application system is divided, wherein each partition of the one or more partitions is allocated a computing resource quota;

determining, by the discovery application and within each respective partition of the one or more partitions, one or more spaces between which the software applications of the managed network are distributed, wherein the one or more spaces of the respective partition share the computing resource quota thereof;

determining, by the discovery application and within each respective space of the one or more spaces, one or more software applications of the software applications of the managed network, wherein the respective space provides an isolated computing environment for execution of the one or more software applications therein;

determining, by the discovery application, a mapping that indicates a distribution of (i) the one or more spaces among the one or more partitions and (ii) the software applications among the one or more spaces;

storing, in persistent storage configured to store data on behalf of the managed network, the mapping determining, by the discovery application, a second distribution of at least one of (i) the one or more partitions, (ii) the one or more spaces, or (iii) the software applications among a subset of the computing resources of an infrastructure system configured to provide computing resources on behalf of the managed network; and determining the mapping to indicate the second distribution.

14. The computer-implemented method of claim 13, wherein the application system is hosted by the infrastructure system configured to provide computing resources on behalf of the managed network, and wherein the one or more partitions, the one or more spaces, and the software applications are distributed among the subset of the computing resources of the infrastructure system.

15. The computer-implemented method of claim 13, wherein the application system comprises (i) a first group of one or more virtual computing devices configured to provide the one or more partitions and the one or more spaces across a plurality of different infrastructure systems and (ii) a second group of one or more virtual computing devices configured to provide a runtime computing environment for the software applications, and wherein the method comprises:

identifying the one or more virtual computing devices of the second group;

determining a third distribution of the software applications across the one or more virtual computing devices of the second group; and determining the mapping to indicate the third distribution.

16. The computer-implemented method of claim 13, comprising:

determining, within each respective space of the one or more spaces, one or more routes for accessing the one or more software applications of the respective space, wherein the application system is configured to match a uniform resource locator (URL) associated with an incoming request against the one or more routes to identify a corresponding software application for which the incoming request is addressed; and determining the mapping to indicate, for each respective route of the one or more routes, the corresponding software application to which the respective route leads.

17. An article of manufacture including a non-transitory computer-readable medium, having stored thereon program instructions that, upon execution by a computing system, cause the computing system to perform operations comprising:

obtaining a service identifier for an application system that hosts software applications on behalf of a managed network, wherein the service identifier provides access to a plurality of partitions into which the application system is divided;

determining, based on the service identifier, one or more partitions of the plurality of partitions into which the application system is divided, wherein each partition of the one or more partitions is allocated a computing resource quota, and wherein determining the one or more partitions comprises:

receiving selection of the one or more partitions of the plurality of partitions to define a scope of discovery; and obtaining, from the application system, attributes of the one or more partitions that were selected;

determining, within each respective partition of the one or more partitions, one or more spaces between which the software applications of the managed network are distributed, wherein the one or more spaces of the respective partition share the computing resource quota thereof;

determining, within each respective space of the one or more spaces, one or more software applications of the software applications of the managed network, wherein the respective space provides an isolated computing environment for execution of the one or more software applications therein;

determining a mapping that indicates a distribution of (i) the one or more spaces among the one or more partitions and (ii) the software applications among the one or more spaces; and storing, in persistent storage configured to store data on behalf of the managed network, the mapping.

* * * * *